Jan. 11, 1944.  N. MUTCH  2,338,779
GRADING OR SEPARATION OF PARTICLES OF SOLIDS, LIQUIDS, OR GASES
Filed Jan. 24, 1940  2 Sheets-Sheet 1
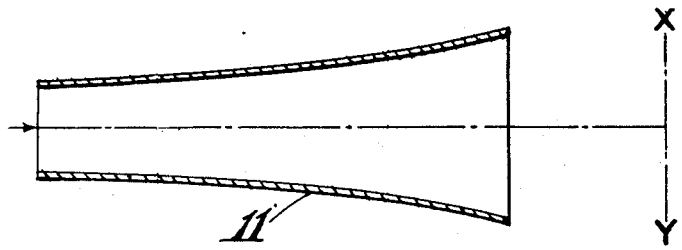
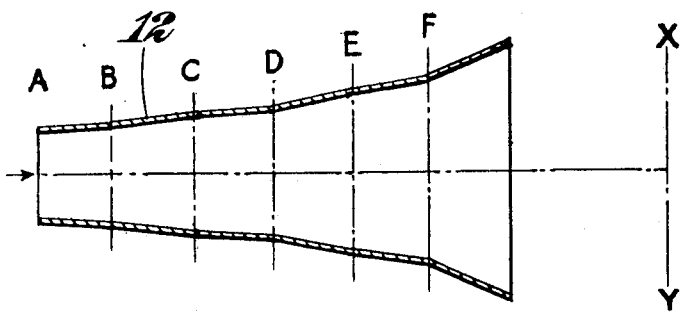
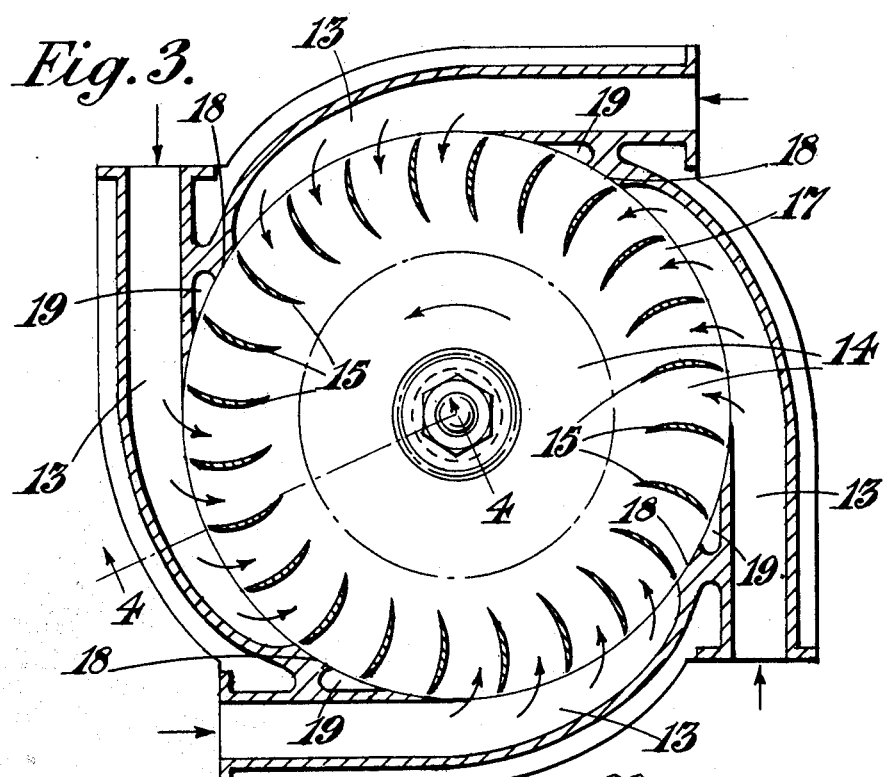
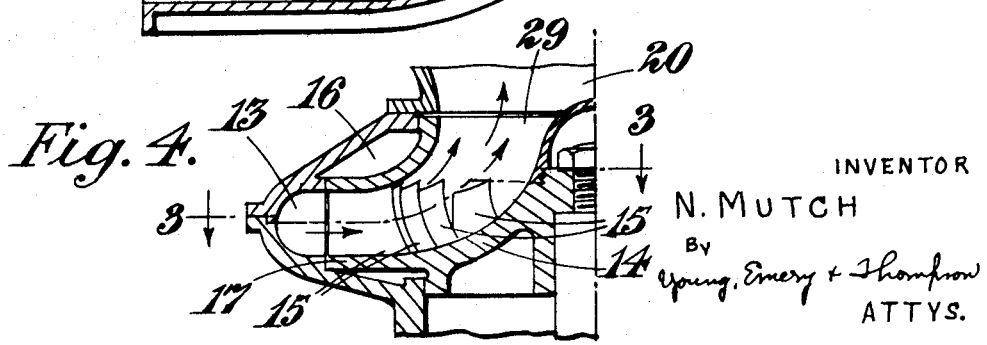
INVENTOR
N. MUTCH
By
Young, Emery & Thompson
ATTYS.

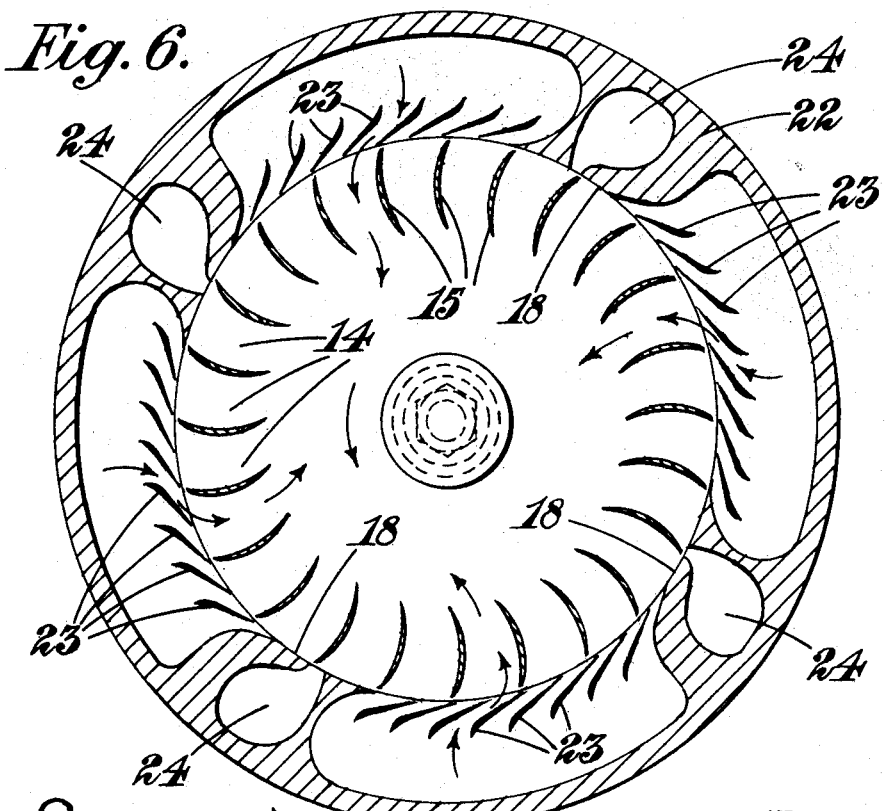
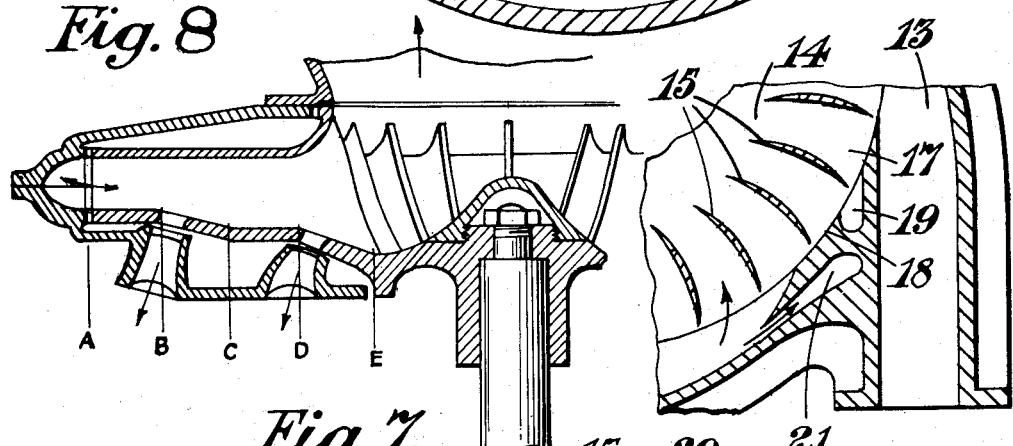
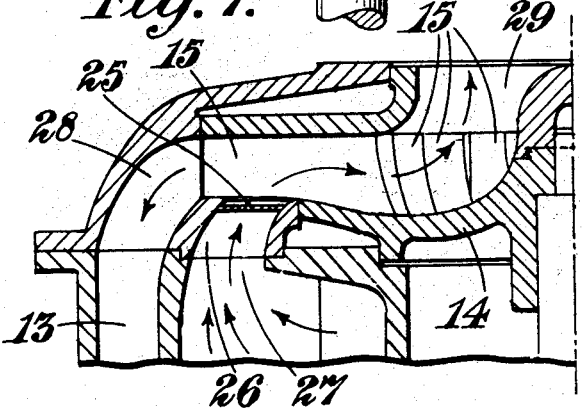

Patented Jan. 11, 1944

2,338,779

UNITED STATES PATENT OFFICE 2,338,779

GRADING OR SEPARATION OF PARTICLES OF SOLIDS, LIQUIDS, OR GASES

Nathan Mutch, London, England

Application January 24, 1940, Serial No. 315,451
In Great Britain January 27, 1939

7 Claims. (Cl. 209—144)

This invention comprises improvements in or relating to the grading or separation of particles of solids, liquids or gases.

It is an object of the invention to grade solid particles or liquid droplets or gas bubbles dispersed in a fluid medium (liquid or gas) on the basis of size and density.

In the past such grading has been attempted in several ways:

(1) Sieving;
(2) Washing and sedimentation;
(3) The addition of electrolytes to suspensions by which means an electric charge is imparted to the finest particles, e. g., kaolin in water. Separation has then been accomplished either by causing the smaller charged particles to move in an electric field or by allowing the larger uncharged particles to fall under the influence of gravity.
(4) Simple centrifugalisation.

The present invention comprises a process of grading or separation of "particles" dispersed in a fluid medium characterised by the fact that the dispersion of "particles" and medium is subjected to centrifugal force and the medium is caused to flow in a contrary direction to the tendency to motion of the "particles" under the action of centrifugal force, at a controlled speed such that "particles" of a size greater than that which it is desired to retain in the medium (or of a density which differs more widely from that of the fluid medium) are unable to move with the medium against the action of centrifugal force while finer or less dense "particles" move with it and are thereby separated from the others. It is to be understood that under the term "particles" there is included not only solid "particles" but also liquid droplets such as the droplets of a mist or of oil in a suspension in water and also minute gaseous bubbles such as the bubbles in a foam. When the "particles" are heavier (denser) than the fluid in which they are dispersed they tend, under the action of centrifugal force, to move outwardly and the fluid medium will, therefore, in accordance with the present invention, move inwardly in a contrary direction to the tendency of motion of the "particles." On the other hand, when the "particles" are lighter than the fluid, as is the case with a foam of air bubbles or a suspension of oil droplets in water, the tendency is for the "particles" to move inwardly when the dispersion is subjected to centrifugal force and in this case the fluid medium will be allowed to move outwardly at a controlled rate under the action of centrifugal force, the rate of outward movement of the fluid being such as to lead to the desired separation of the larger bubbles or droplets from the smaller ones.

Preferably the radial velocity of the dispersion is made, between two selected radii, to vary inversely as the radius so as to form a zone in which the tendency to separation is constant throughout the zone. By the tendency to separation being constant is meant that the critical differentiation of the "particles" which is effected is the same throughout the zone. That is to say, if "particles" of a size or density $x$ are rejected at one part of the zone they would equally be rejected at another part of the zone of smaller radius. This greatly assists critical separation.

A plurality of different zones in which the radial velocity of the dispersion varies as just described may be provided one within another, through which the dispersion passes in succession, said zones being separated by zones of collection wherein separated "particles" are collected from the dispersion. As already indicated the invention may be applied to various types of dispersion. For example, it may consist of a mist of liquid droplets suspended in a gas and such a suspension may be passed through the separation zone inwardly against the action of centrifugal force and thereby be relieved at the outer edge of the separation zone of heavier or denser droplets. Again, the dispersion may consist of a suspension emulsion or foam wherein the "particles" are lighter than the liquid medium and the movement of the liquid is a controlled outward flow, the larger bubbles or droplets, as the case may be, being prevented from flowing outward by the effect of centrifugal force while the smaller bubbles or droplets move with the liquid. Then again the dispersion may consist of solid or liquid "particles" suspended in a liquid of lighter specific gravity than the particles and then the direction of flow of the liquid is inward, so that heavier or denser "particles" are left at the outer edge of the separation zone. Finally, it may consist of solid "particles" suspended in a gas and the gas may flow inwardly against the action of centrifugal force, whereby heavier or denser "particles" are separated at the outer edge of the separation zone.

While the separation of larger or denser "particles" has been hereinabove referred to it will be understood that the separation will follow the known laws depending on the viscous drag of the liquid on the "particles" on the one hand and the centrifugal force exerted by the rotation of the "particles" on the other hand, this force being in the present invention substituted for that of gravity which latter obtains in known classification processes. The substitution of centrifugal force for the force of gravity has the advantage that the force applied to the particles can be readily controlled whereas gravitational force is constant and limited. As is known the separation therefore depends not only on the density of the "particles" and not only on their size, but on both factors, and also of course partly upon their shape, and the conditions of the process will in practice be regulated, if necessary, by preliminary experimental tests so as to obtain the best results. For the sake of simplicity in this specification in many cases the separation of larger from smaller "particles" is referred to but it is to be understood that this is not intended to limit the use of the apparatus to cases where the "particles" are all of the same density and size alone determines their separation.

An important and particular application of the invention is to the treatment of mists of liquids having germicidal properties, or which are lethal to insect carriers of disease or having therapeutic properties. In this connection the invention comprises a process for the treatment of such mists consisting in subjecting the mist to the action of centrifugal force while causing it to flow inwardly against the centrifugal force at such a rate that only droplets of the liquid of a size smaller than a predetermined size are carried inwardly against the action of centrifugal force, so that the mist is separated from coarser particles and thus the quantity of liquid necessary to produce a given number of droplets per unit volume is reduced.

The invention further includes apparatus for carrying out processes as set forth above, characterised by the provision of a rotating member having one or more passages for the dispersion to be separated having a radial component to their direction, means to feed the suspension to one end of said passage or passages, means to draw off the suspension from the other end of said passages and means to collect larger separated particles from the periphery of the path of the entrance end or ends of said passage or passages.

The following is a description by way of example of certain forms of apparatus in accordance with the invention and of the process as carried out therein:

In the accompanying drawings:

Figure 1 is a diagram showing one form of separating passage;

Figure 2 is another diagram showing another form;

Figure 3 is a horizontal section through the centre of a complete apparatus;

Figure 4 is a section upon the line 4—4 of Figure 3;

Figure 5 is a detail showing a modification;

Figure 6 is a view similar to Figure 3 of a modified form of apparatus, and

Figure 7 is a half-section through a further modified form.

Referring to Figure 1, the chain line XY is to be regarded as an axis of rotation about which there may be rotated the tube 11 which is so shaped that its cross-sectional area is inversely proportional at all points to its distance from the axis XY. It follows that if the tube is revolved about the axis XY and a fluid medium containing particles in suspension is passed through the tube toward the axis, the velocity of the suspension will at all points be directly proportional to the centrifugal force exerted upon it. The centrifugal force exerted on solid or liquid droplets (if of higher density than the medium) will tend to make them move outwardly but the inward flow of the suspending liquid will tend to carry them in with it, that is to say, the suspending fluid will exert a frictional drag on the particles. If we assume that this drag is directly proportional to the relative speed between the fluid and the particles then the size of particle which can be dragged inwardly by the suspending fluid is with a tube of the shape described the same at all radii. Therefore larger particles than those which at a particular speed can be dragged inwardly will all fly out of the tube under the action of centrifugal force while smaller particles will all be drawn in. If the law of friction (or viscosity) between the suspending fluid and the particles is not one of direct proportionality this can be allowed for by a corresponding variation in the shape of the tube.

If we suppose that the tube is not shaped as in Figure 1, but is, say, cylindrical, separation is still effected but what happens is that any coarse particles which succeed in passing inwardly beyond a particular plane will thereafter be carried inwardly with still greater certainty because the centrifugal force upon them is decreasing. Therefore the certainty of removal of the coarse particles is not so great. On the other hand, if the tube is flared too much it may be that fine particles will tend to collect in a cloud at the wider end without being properly carried away. Any corrections to the particular shape of the tube which experience might dictate could readily be adopted after tests and it will be seen at once that in principle it is possible to mount a number of such tubes pointing radially outwards about a supporting spindle and to pass large quantities of a suspension inwardly through them, the tubes at any particular speed rejecting particles which are larger than those which can be carried inwardly against the action of centrifugal force. If the particles in a suspension are not all of the same density then the denser particles will tend to be thrown out in a manner parallel to the well known effects which occur in gravity classification apparatus, but in the present invention there is substituted for gravity the much greater and readily controllable force due to centrifugal action. If the liquid to be separated is a foam or an emulsion in which the particles are lighter than the suspending liquid the same considerations apply but the direction of motion is reversed.

Referring to Figure 2, this shows a tube 12 rotating about an axis XY as in the case of Figure 1. In this case the section of the tube lying between the planes A and B is made of a cross-section which varies inversely with the radius or has an experimentally determined functional relationship therewith as already described so that the tendency to separation in the zone from A to B is constant. Between the planes B and C the tube is made to expand more rapidly and thus the maximum size of particles which will pass through the section from A to B will refuse to pass through the section from B to C and such particles of maximum size will collect at the plane B and from here they can, by suitable means be withdrawn, permitting only the finer particles to pass on into the section from plane C to plane D. This zone expands once again in accordance with the same law as the zone from A to B. As the speed through this zone is slower than through the zone from A to B it acts as a filter which allows only finer particles to pass. The expansion from plane D to plane E is more rapid than the separation law prescribes and therefore the least fine particles which pass the plane D will tend to collect at this plane, leaving only still finer particles to pass on beyond the plane E. By such a tube, with appropriate means of removal at the planes B and D several grades of particle can be produced. That is to say, the coarsest particles are removed at the entrance plane A, a less coarse grade at the plane B, a finer grade at the plane D and the finest material passes on in the suspension past the plane E. There is a further removal at plane F if the passage is given a further change of taper at this point as may be done and is shown in the drawings. Further planes of removal may be arranged after plane F if desired.

Figures 1 and 2 are diagrammatic. It is necessary to provide means for the introduction of the medium and the "particles" in it into the tubes in such a way that they enter with the least possible shock, as otherwise they tend to be shaken out of suspension. Moreover, the whole flow of the medium and its dispersed particles must be kept as smooth as possible everywhere. Figures 3 to 6 indicate apparatus which has been designed to embody the principles of Figures 1 and 2 in a practical form.

Referring to Figures 3 and 4, these show an apparatus comprising four inlet passages 13 which surround a rotating separating wheel 14 provided with curved peripheral blades 15. The fluid medium carrying the particles to be treated is lead on to the blades 15 by the ducts 13 and the speed of the medium is arranged to be nearly equal in a circumferential direction to the tip speed of the blades 15, the speeds being so arranged as to minimise turbulency at the point of entry into the wheel. As can be seen from the cross-section in Figure 4, the wheel 14 comprises upper and lower walls 16, 17 which diverge from the edge toward the centre and the divergence is made such that the area increases in a regular proportion in accordance with the requirements of separation already expressed. Thus material larger than a particular size is unable to reach the interior of the wheel but is held near the blade tips.

It will be appreciated that suitable means should be provided to impart an appropriate speed with suspension and to keep the wheel running at its proper speed. As the medium is led on to the blades at the same speed as these latter, no appreciable pull is exerted by the medium on the blades or by the blades on the medium and each must be separately set and kept in motion.

Between the inlets 13 the casting approaches the tips of the blades closely as at 18 in the figure and in the surfaces 18 there are outlet ducts 19 into which the coarser material is thrown by the blades as soon as they pass out of communication with the inlets 13. From the ducts 19 there are suitable exits for the coarser material in a direction at an angle to the plane in which the section of Figure 3 is taken. Thus the larger material is removed from the ducts 19 and the suspension with the finer material passes towards the centre where it is allowed to flow out through an outlet 20 (Figure 4) or is withdrawn by some form of suction device.

A certain amount of coarse or heavy material may tend to be thrown out and collect upon the outer walls of the inlets 13 and if desired a draw-off conduit 21 (Figure 5) may be provided to permit of the collection and recovery of this material and prevent it from interfering with the operation of the device.

Referring to Figure 6, this shows an apparatus which is in general similar to that of Figure 3, comprising a rotary separating wheel 14 having blades 15 but in this case it is assumed that the inlets to the casting, indicated by numeral 22, are in a plane other than that shown by the section. The material is in this case guided on to the blades 15 by fixed external guide blades 23 and the coarser particles are removed through ducts 24.

Figure 7 shows another alternative apparatus in which the wheel 14 carrying blades 15 is provided with a lateral inlet opening 25 of annular form at one side of the blades. The dispersion to be treated is directed into the blades through this opening by inclined guides 26 from a feed chamber 27 below the wheel 14. Coarser material is rejected into an outer annular collecting space 28 and the fine suspension passes out through the centre exit 29.

It will be understood that if foams or emulsions of liquids lighter than the medium are being treated the exits 20 or 29 would become inlets and the inlet conduits 13, 23 or 26, as the case may be, would become outlets.

As will be appreciated, it would be possible to make the contour of the wheel 14 stepped like Figure 2 if desired and to provide outlets in the side of it at suitable places similar to the openings 25.

In addition to the application of the invention to the use of germicides and the like as already described it may be applied if desired to the production of fine mists for other purposes.

The production of fine even foams has already been referred to and the separation or grading of all kinds of solid matters suspended in liquids or gases is another field of application of great practical importance.

I claim:

1. A process of grading particles dispersed in a fluid medium comprising introducing the dispersion of particles and medium into a rotating vaned wheel with an initial velocity in the direction of rotation of the wheel substantially equal to the velocity of the vanes at the point of entry thereto so that it enters between the vanes thereof without shock, subjecting the dispersion in the wheel to centrifugal force, causing the medium to flow in a direction contrary to the tendency of motion of the particles under the action of centrifugal force at a controlled speed such that particles of size greater than that which it is desired to retain in the medium, and particles of a density which differs more widely from that of the fluid medium, are unable to move with the medium against the action of centrifugal force while finer particles, and those differing less widely in density, move with it and are thereby separated from the others, said dispersion being passed successively through a number of different zones in each of which between two selected radii the radial velocity of the dispersion varies inversely as the radius, said zones being separated by zones of collection wherein separated particles are collected.

2. Apparatus for grading particles dispersed in a fluid medium, comprising a vaned wheel having passages between the vanes for the dispersion to be graded, a casing surrounding the vaned wheel and having tangential passages to feed the dispersion, the walls of the passages closely approaching the periphery of the wheel at separated points around the periphery, and means for drawing off separated "particles" at the places where the walls of the passages approach the periphery of the wheel.

3. Apparatus for grading particles dispersed in a fluid medium, comprising a vaned wheel having passages between the blades for the dispersion to be graded, a casing surrounding the vaned wheel and having tangential passages or guide blades to feed the dispersion, the walls of the passages closely approaching the periphery of the wheel at separated points around the periphery of the wheel, outlet means for separated "particles" spaced apart from the tangential passages by portions of the casing which are of sufficient length in a peripheral direction to "blank off" the outlet means from connection with the tangential passages or guide blades.

4. A process of grading particles dispersed in a fluid medium comprising introducing the dispersion of particles and medium in stream line flow tangentially at a plurality of circumferentially spaced zones about a rotating vaned wheel into closely juxtaposed flow paths between the vanes extending substantially radially of the wheel and which juxtaposed paths comprise the major portion of the circumference of the wheel and which zones of introduction have a circumferential extent greater than that of the spacing between them, and with an initial velocity in the direction of the wheel rotation substantially equal to that of the vanes at the points of entry thereto, flowing the medium through the flow paths in the vaned wheel in a direction contrary to the centrifugal force exerted thereby on said medium and thereby subjecting particles in said medium to the opposing actions of centrifugal force and viscosity drag of the flowing medium, varying the cross-sectional area of at least a substantial length of the stream of dispersion in said wheel in such manner that the velocity of flow is proportional to the centrifugal force whereby particles of mass properties such that centrifugal action thereon predominates over viscosity drag are separated throughout said length of stream, removing the thus separated particles at circumferentially spaced regions intermediate said spaced zones of introduction, and removing the medium with the remaining dispersed particles at the end of said length of stream.

5. Apparatus for grading particles dispersed in a fluid medium, comprising a wheel having vanes of concavo-convex section forming passages for the dispersion while being graded, a casing surrounding said wheel and having a plurality of inlet ducts arranged tangentially to said wheel and a plurality of outlet ducts for separated particles alternating with said inlet ducts, an outlet duct for said dispersion after being graded, and means for driving said wheel.

6. Apparatus for grading particles dispersed in a fluid medium, comprising a wheel having vanes of concavo-convex section arranged for the passage of the dispersion while being graded, a casing surrounding said wheel and having inlet chambers for the dispersion and outlet ducts for separated particles alternating in the casing, said chambers and ducts having walls in juxtaposition to the periphery of said wheel, guide blades for said dispersion arranged in said inlet chambers, outlet means from said casing for said dispersion after being graded, and means for driving said wheel.

7. Apparatus for grading particles dispersed in a fluid medium comprising, a wheel having vanes for passage of the dispersion while being graded each of said passages formed by the vanes having alternating zones for separation and collection of separated particles, ducts in said casing for receiving particles from said collection zones, outlet means on said casing for said dispersion after being graded, and means for driving said wheel.

NATHAN MUTCH.